United States Patent
Hiscock et al.

(10) Patent No.: US 9,917,780 B2
(45) Date of Patent: Mar. 13, 2018

(54) TRAFFIC CONTROL ACROSS A LAYER 2 LAYER 3 BOUNDARY IN A SOFTWARE DEFINED NETWORK

(71) Applicant: Hewlett-Packard Development Company, L.P., Houston, TX (US)

(72) Inventors: James S. Hiscock, Rockport, MA (US); Joseph A. Curcio, Jr., Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 198 days.

(21) Appl. No.: 14/777,489

(22) PCT Filed: Mar. 15, 2013

(86) PCT No.: PCT/US2013/032106
§ 371 (c)(1),
(2) Date: Sep. 15, 2015

(87) PCT Pub. No.: WO2014/142971
PCT Pub. Date: Sep. 18, 2014

(65) Prior Publication Data
US 2016/0036706 A1  Feb. 4, 2016

(51) Int. Cl.
*H04L 12/801* (2013.01)
*H04L 12/26* (2006.01)
*H04L 12/721* (2013.01)
*H04L 12/46* (2006.01)
*H04L 12/24* (2006.01)

(52) U.S. Cl.
CPC ............ *H04L 47/12* (2013.01); *H04L 12/462* (2013.01); *H04L 41/0896* (2013.01); *H04L 43/14* (2013.01); *H04L 45/66* (2013.01); *H04L 47/115* (2013.01)

(58) Field of Classification Search
None
See application file for complete search history.

(56) References Cited

U.S. PATENT DOCUMENTS

| 6,463,035 B1 | 10/2002 | Moore |
| 2007/0076604 A1 | 4/2007 | Litwack |
| 2010/0220588 A1 | 9/2010 | Plamondon |

(Continued)

FOREIGN PATENT DOCUMENTS

| WO | WO-2010/138937 A2 | 12/2010 |
| WO | WO-2012/130264 A2 | 10/2012 |

OTHER PUBLICATIONS

"Data Center Interconnect: Layer 2 Extension Between Remote Data Centers," Mar. 2013, pp. 1-30, White Paper, Cisco Systems, Inc.

(Continued)

*Primary Examiner* — Huy D Vu
*Assistant Examiner* — Hong Shao
(74) *Attorney, Agent, or Firm* — Hewlett Packard Enterprise Patent Department

(57) ABSTRACT

Traffic control can be provided across a Layer 2-Layer 3 boundary in a software defined network. A network controller can receive information related to a number of conditions in a software defined network (SDN) from a number of network devices. The network controller can provide network traffic control across a Layer 2-Layer 3 boundary in the SDN based on the received information.

20 Claims, 5 Drawing Sheets

(56) References Cited

U.S. PATENT DOCUMENTS

Figure 1:
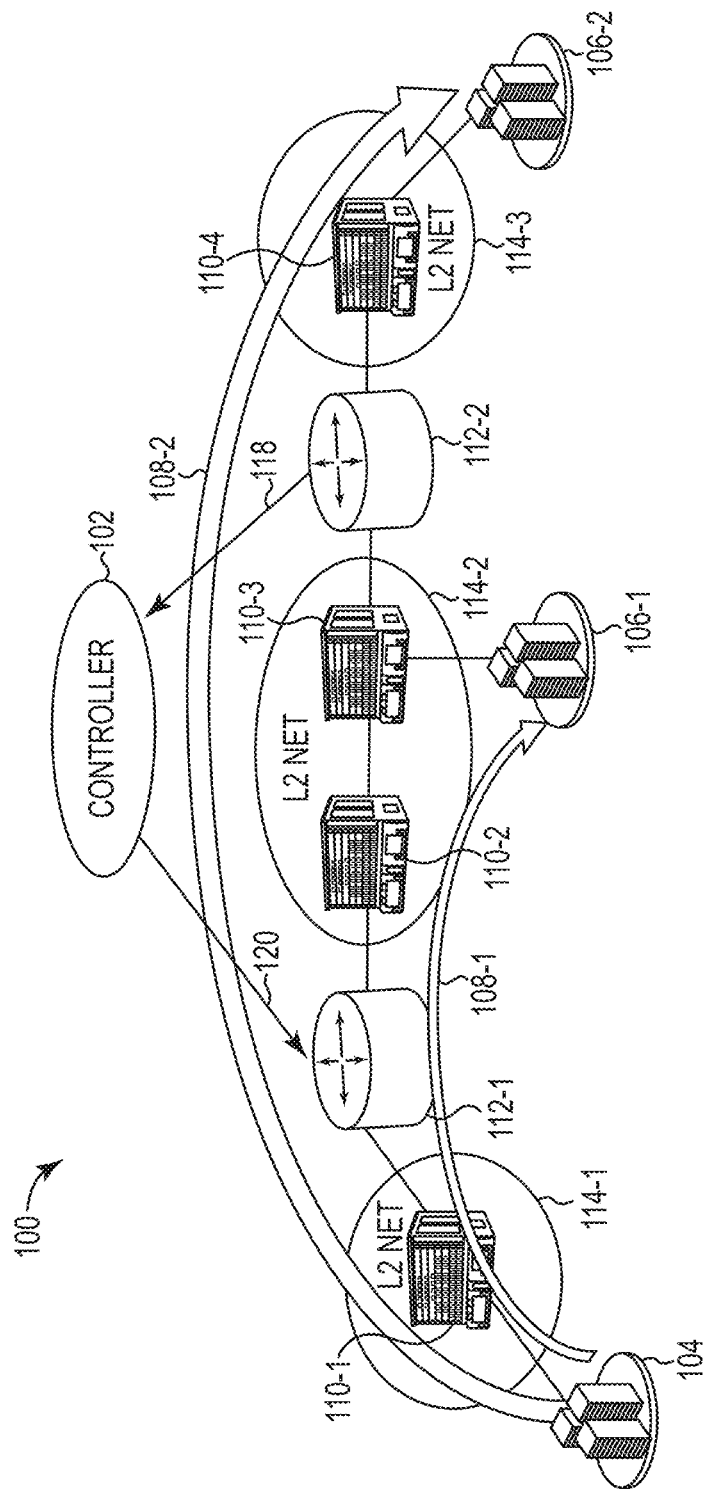

| | | | |
|---|---|---|---|
| 2011/0261686 A1 | 10/2011 | Kotha et al. | |
| 2012/0287782 A1 | 11/2012 | Lv et al. | |
| 2014/0003232 A1* | 1/2014 | Guichard | H04L 67/16 |
| | | | 370/230 |
| 2014/0254373 A1* | 9/2014 | Varma | H04W 40/36 |
| | | | 370/235 |
| 2015/0043584 A1* | 2/2015 | Ayandeh | H04L 49/357 |
| | | | 370/392 |

OTHER PUBLICATIONS

"DCB and FCoE," Feb. 22, 2013, pp. 1-2, Brocade.com.
Casimer Decusatis, "Towards an Open Data Center with an Interoperable Network: Enterprise Networking using Open Industry Standards," Oct. 4, 2012, pp. 1-12, IBM Corporation.
International Search Report and Written Opinion, International Application No. PCT/US2013/032106, dated Dec. 4, 2013, pp. 1-9.
Renato Recto, "OpenFlow in Enterprise Data Centers Products, Lessons and Requirements," Apr. 20, 2012, pp. 1-21, IBM Fellow & System Networking CTO, IBM Corporation.

* cited by examiner

TRAFFIC CONTROL ACROSS A LAYER 2 LAYER 3 BOUNDARY IN A SOFTWARE DEFINED NETWORK

BACKGROUND

In computer networking, the control plane refers to definition of how network traffic is handled (e.g., via protocols such as spanning tree, open shortest path first, border gateway protocol, etc.) in a network device. The data plane refers to the actual handling of the network traffic according to the control plane (e.g., using forwarding tables, routing tables, queues, etc.) in a network device. The control plane may be said to be distributed in a typical network where each network device includes a control plane and a data plane. Thus, in the event of network congestion, each network device may take corrective action largely independently of other network devices.

BRIEF DESCRIPTION OF THE DRAWINGS

FIG. 1 is a diagram illustrating an example of a software defined network according to the present disclosure.

FIG. 2 is a diagram illustrating an example of a software defined network according to the present disclosure.

FIG. 3 is a diagram illustrating an example of a software defined network according to the present disclosure.

FIG. 4 is a flow chart illustrating an example of a method for Data Center Bridging in a software defined network according to the present disclosure.

FIG. 5 illustrates an example of a network controller according to the present disclosure.

DETAILED DESCRIPTION

Ethernet is a protocol that can carry different kinds of traffic including Internet Protocol (IP), Fiber Channel (FC), among others. However, the Ethernet protocol can provide a kind of best-effort network that may experience data unit (e.g., frame, packet, etc.) loss when communication paths or devices in the network are busy. Fibre channel over Ethernet (FCoE) protocol operates directly above the Ethernet in the network protocol stack in the data link layer, which is Layer 2 in the open systems interconnection (OSI) model. One application of FCoE is in data center storage area networks (SAN). FCoE may allow fewer cables to be used versus some other approaches. However, FCoE may be particularly sensitive to data unit loss. Furthermore, FCoE does not operate at the network layer (Layer 3 in the OSI model) of interconnected networks and will not cross data link layer boundaries of interconnected networks. Thus, FCoE's procedures may not be transferable across network boundaries within interconnected networks. Since the functions of FCoE may be defined in terms of Layer 2 networks, FCoE may have a limited reach. IP provides some traffic management controls, but may not provide significant FCoE functionality.

Network traffic control refers to managing, prioritizing, and/or reducing communication of data units among connected network devices, among other functions such as those described herein. IP transport protocols are examples of protocols that can be used to provide network traffic control (e.g., at Layer 3). Data center bridging (DCB) is an example of a number of peer to peer quality of service (QoS) protocols that can be used to provide network traffic control (e.g., at Layer 2).

Data center bridging (DCB) refers to a set of enhancements to Ethernet local area networks (LANs) for use in data center environments. Goals of DCB can include eliminating loss due to queue overflow (e.g., lossless Ethernet) and to be able to allocate bandwidth on links. DCB can allow different priorities to be treated as different pipes. However, DCB may be limited to a local Layer 2 switching area. Furthermore, distributed implementation may provide limited visibility of the network as a whole. Network visibility can include information regarding devices in the network (e.g., device type, capabilities, status, etc.) and information regarding performance of the network (e.g., available bandwidth, resources, identified problems, etc.)

In contrast, a number of examples of the present disclosure can employ methods, systems, and machine-readable and executable instructions for network traffic control across a Layer 2-Layer 3 boundary in a software defined network. A network controller can receive information related to a number of conditions in a software defined network (SDN) from a number of network devices. The network controller can provide network traffic control across a Layer 2-Layer 3 boundary in the SDN based on the received information. Thus, traffic can be controlled across the IP data center network to provide, for example, DCB functions propagated across Layer 2 switching domains and provide global visibility using an SDN controller. Examples of DCB functions include priority-based flow control, enhanced transmission selection, and congestion notification, among others.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a diagram illustrating an example of a software defined network 100 according to the present disclosure. The software defined network (SDN) 100 can include a network controller 102 (e.g., an SDN controller). An SDN is a form of network virtualization in which the control plane is separated from the data plane and implemented in a software application. Network administrators can therefore have programmable centralized control of network traffic without requiring physical access to the network's hardware devices. The network controller 102 can include a processing resource in communication with a memory resource. The memory resource can include a set of instructions, executable by the processing resource to perform a number of functions described herein. In some examples, the network controller 102 can be a discrete device, such as a server. In some examples, the network controller 102 can be a distributed network controller, for example, such as a cloud-provided functionality. One example of a protocol for SDN is OpenFlow, which is a communications protocol that provides access to the forwarding plane of a network switch over the network. Some examples of the present disclosure can operate according to an OpenFlow, or other SDN protocol, and/or a hybrid of an SDN protocol combined with "normal" (e.g., distributed control plane) networking.

The network controller 102 can be in communication with and/or have control over network devices 110-1, 110-2, 110-3, 110-4, 112-1, and 112-2. For example, network devices 110-1, 110-2, 110-3, and 110-4 can be switches and network devices 112-1 and 112-2 can be routers. Examples are not limited to the specific number of network devices illustrated in the SDN 100. Switch 110-1 is included in a first Layer 2 network 114-1. Switches 110-2 and 110-3 are included in a second Layer 2 network 114-2. Switch 110-4 is included in a third Layer 2 network 114-3. A first router 112-1 connects the first Layer 2 network 114-1 to the second Layer 2 network 114-2 via switch 110-1 and switch 110-2. A second router 112-2 connects the second Layer 2 network 114-2 to the third Layer 2 network 114-3 via switch 110-3 and switch 110-4. The routers 112-1, 112-2 can provide Layer 3 (e.g., IP) functionality to the SDN 100. Links between various routers and Layer 2 networks can mark Layer 2-Layer 3 boundaries for the SDN 100. Examples are not limited to the specific network layout or numbers of network devices illustrated herein.

A first network traffic flow 108-1 is illustrated between a traffic source 104 and a first traffic destination 106-1. The first flow 108-1 passes through the first Layer 2 network 114-1 and the second Layer 2 network 114-2 and across a Layer 2-Layer 3 boundary indicated by the links between the first Layer 2 network 114-1, the first router 112-1, and the second Layer 2 network 114-2. A second flow 108-2 is illustrated between the traffic source 104 and a second traffic destination 106-2. The second flow 108-2 passes through the first Layer 2 network 114-1, the second Layer 2 network 114-2, and the third Layer 2 network 114-3 and across a first Layer 2-Layer 3 boundary indicated by the links between the first Layer 2 network 114-1, the first router 112-1, and the second Layer 2 network 114-2 and a second Layer 2-Layer 3 boundary indicated by the links between the second Layer 2 network 114-2, the second router 112-2, and the third Layer 2 network 114-3. For example, the traffic source 104 and the traffic destinations 1061, 106-2 can be client devices, data centers, or other electronic devices capable of communicating with the SDN 100.

If a switch senses outbound congestion for a particular traffic flow, the switch may send a pause for the traffic flow to its upstream Layer 2 neighbor (e.g., a switch immediately upstream of the switch sensing the congestion). For example, using priority-based flow control defined under the Institute of Electrical and Electronics Engineers (IEEE) 802.1Qbb standard, a priority code point field in an IEEE 802.1Q tag can enable control (e.g., pausing) of a number of individual flows (e.g., eight flows) based on a particular data unit's priority (e.g., while other flows continue uninterrupted). Priorities can be identified in a header of a number of data units of a flow. Priorities can be tagged by a source of the flow and/or by a network device along the path of the flow. By way of example, voice over IP (VoIP) may have a high priority (e.g., due to relatively high QoS for VoIP communication) and file transfer protocol (FTP) flows may have a lower priority (e.g., due to a relatively lower QoS for FTP).

However, using such approaches may be inefficient in that pausing another network device further upstream, possibly across a Layer 2-Layer 3 boundary, could be more efficient than pausing a Layer 2 neighbor upstream switch, such as a Layer 2 neighbor switch that is immediately upstream of the network device sensing the congestion. Thus, according to some examples of the present disclosure, a network device sensing congestion can notify the controller 102 of the congestion and the controller 102 (having a more global view of network conditions of the network 100) can determine an appropriate pause (e.g., a per priority pause) to use and to which upstream network device the pause should be sent. The network controller 102 can employ an algorithm that draws on a wider array of information from different sources in the SDN 100 to determine an appropriate corrective action, such as sending a pause to a particular network device.

The network controller 102 can gain information about traffic flows (e.g., traffic flows 108-1 and 108-2) in the network 100 from sources such as counters, event logs, and other information bases associated with network devices 110-1, 110-2, 110-3, 110-4, 112-1, and 112-2 in the network 100. The network controller 102 can make traffic control decisions, as described herein, using this information. When a traffic flow (e.g., traffic flow 108-2) starts, the network controller 102 can be alerted. The network controller 102 can determine a path for the traffic flow and program appropriate network devices 110-1, 110-2, 110-3, 110-4, 112-1, and 112-2 with traffic handling (e.g., filtering, forwarding, etc.) instructions that result in the traffic flow taking the planned network path. Thus, the network controller 102 has a detailed view of the traffic flows in the network 100 and the resulting possible congestion spots. This information can be leveraged by the network controller 102 to make traffic control decisions and take actions to relieve network congestion with moderated disturbance (if any) to other traffic flows in the network 100, as described herein.

For example with respect to FIG. 1, the network controller 102 can receive information comprising a congestion notification 118 related to a number of network conditions (e.g., relating to the traffic flow 108-2) from a first network device (e.g., network device 112-2) in the SDN 100. The network controller 102 can provide network traffic control across a Layer 2-Layer 3 boundary in the SDN 100 based on the received information. For example, the network traffic control can include the network controller 102 determining a network device 112-1 upstream of the network device 112-2 with respect to the congestion based on the congestion notification 118 and/or information received from others of the number of network devices 110-1, 110-2, 110-3, 110-4, 112-1, and 112-2. The network controller 102 can receive information related to a number of network conditions other than congestion notifications from the network devices 110-1, 110-2, 110-3, 110-4, 112-1, and 112-2, which can allow the controller 102 to make an informed determination as to which network device 110-1, 110-2, 110-3, 110-4, 112-1, and 112-2 should receive the pause for network efficiency. Such examples can be beneficial over some previous approaches, which may send a pause to an upstream neighbor without considering network conditions beyond a neighboring network device and/or a Layer 2-Layer 3 boundary.

The network traffic control can include the network controller 102 sending a per priority pause 120 to the network device 112-1, which is across a Layer 2-Layer 3 boundary from the network device 112-2. In this example, routers 112-1 and 112-2 are separated by Layer 2 network 114-2. The per priority pause 120 can pause the traffic flow 108-2, while the traffic flow 108-1 can continue. That is, the traffic flow 108-1 would be unaffected by the per priority pause 120 and only the traffic flow 108-2, which was causing the congestion, would be affected. In this example, the per priority pause 120 can be a Layer 3 pause, however examples are not so limited. In some examples, the number of network devices 110-1, 110-2, 110-3, 110-4, 112-1, and 112-2 (or a portion thereof) are configured not to provide network traffic control (e.g., DCB functionality) independent of the controller 102. The routers 112-1, 112-2 can have two sets of transmit queues, with one set for the local Layer 2 network and another to the next hop router. Thus, router-to-router pausing can be implemented without restricting traffic to the local Layer 2 network attached network devices (e.g., stations) and vice versa.

Figure 2:
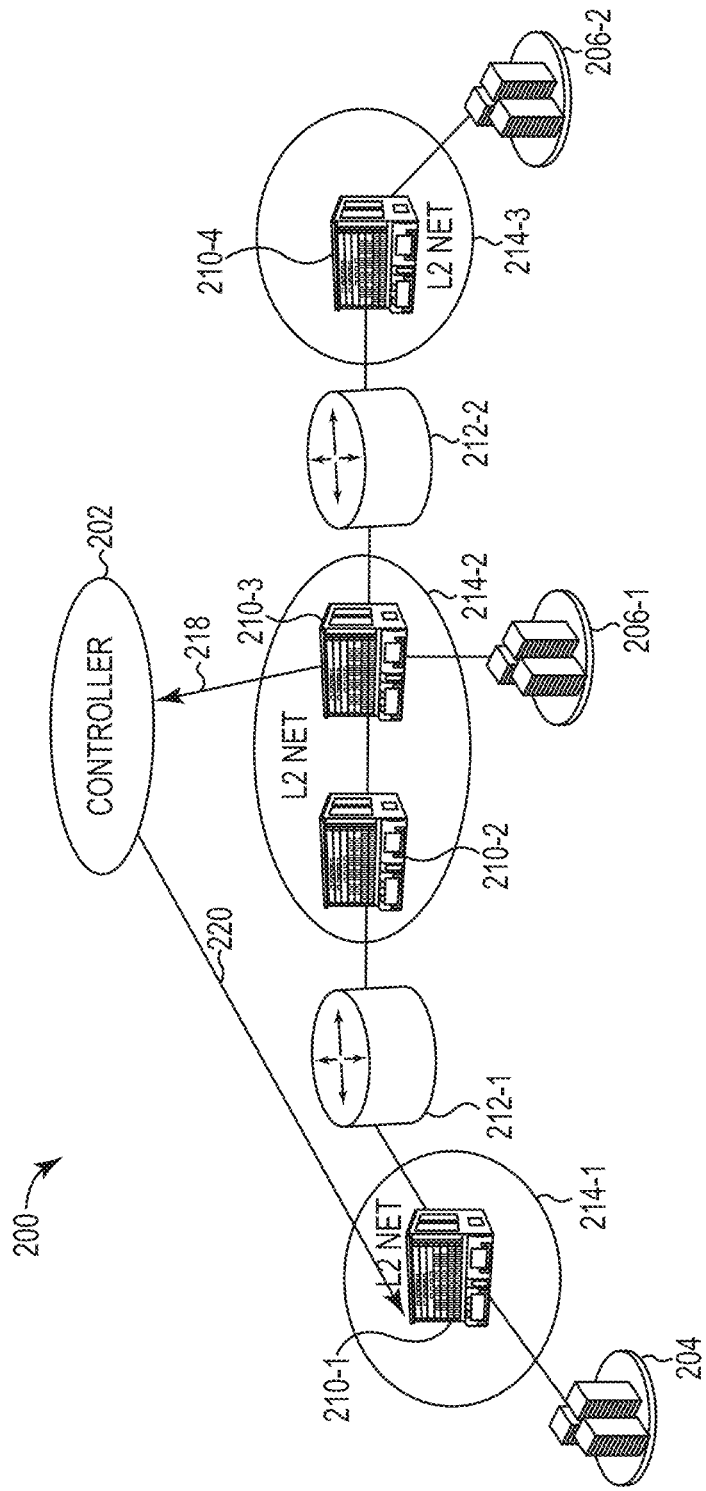

FIG. 2 is a diagram illustrating an example of a software defined network 200 according to the present disclosure. The SDN 200 can be analogous to the SDN 100 illustrated in FIG. 1. Accordingly, the network controller 202, the traffic source 204, the traffic destinations 206-1 and 206-2, the network devices 210-1, 210-2, 210-3, 210-4, 212-1, and 212-2, and the Layer 2 networks 214-1, 214-2, and 214-3 can be analogous to the network controller 102, the traffic source 104, the traffic destinations 106-1 and 106-2, the network devices 110-1, 110-2, 110-3, 110-4, 112-1, and 112-2, and the Layer 2 networks 114-1, 114-2, and 114-3 illustrated in FIG. 1.

The SDN 200 can include a plurality of Layer 2 networks 214-1, 214-2, and 214-3 including a number of switches 210-1, 210-2, 210-3, 210-4. The Layer 2 networks 214-1, 214-2, and 214-3 can be interconnected by a number of routers 212-1 and 212-2. The number of switches 210-1, 210-2, 210-3, 210-4 and the number of routers 212-1 and 212-2 can sense a number of network conditions and notify the network controller 202 regarding the number of network conditions. The network controller 202 can be in communication with the number of switches 210-1, 210-2, 210-3, 210-4 and the number of routers 212-1 and 212-2. The network controller 202 can provide network traffic control across the Layer 2 networks 214-1, 214-2, and 214-3 collectively to address congestion based on the number of network conditions.

If a switch senses outbound congestion for a particular traffic flow, the switch may send a pause for the traffic flow to its upstream Layer 2 neighbor (e.g., a switch immediately upstream of the switch sensing the congestion). For example, using congestion notification defined under the IEEE 802.1Qau standard, an end-to-end mechanism may allow throttling of traffic at the end devices (e.g., stations) in the Layer 2 network by the sensing switch sending a message to the end device in the Layer 2 network to reduce its transmission rate per traffic flow. The switch to which the message may be sent is referred to as a reaction point. However, using such approaches may be inefficient in that the network device sensing congestion is burdened with limited visibility, particularly across a Layer 2-Layer 3 boundary. For example, in FIG. 2, if the switch 210-3 sensed congestion, it could send a congestion notification to switch 210-2, as a reaction point.

In contrast, according to some examples of the present disclosure, a network device sensing congestion can notify the controller 102 of the congestion and the controller 202 (having a more global view of network conditions of the network 202) can determine an appropriate reaction point (e.g., another network device, such as switch 210-1) for which to throttle traffic. A number of examples of the present disclosure can allow the network controller 202 to execute instructions that draw upon a wider array of information from different sources in the SDN 100 to determine an appropriate reaction point.

For example with respect to FIG. 2, the network controller 202 can receive information comprising a congestion notification 218 related to a number of network conditions from a network device 210-3 in the SDN 200. The network controller 202 can provide network traffic control across a Layer 2-Layer 3 boundary in the SDN 200 based on the received information. For example, network traffic control can include the network controller 202 determining a network device 210-1 (a reaction point) upstream of the network device 210-3 with respect to the congestion based on the congestion notification 218 and/or information received from others of the number of network devices 210-1, 210-2, 210-3, 210-4, 212-1, and 212-2. The network controller 202 can receive information related to a number of network conditions other than congestion notifications from the network devices 210-1, 210-2, 210-3, 210-4, 212-1, and 212-2, which can allow the controller 202 to make an informed determination as to which network device 210-1, 210-2, 210-3, 210-4, 212-1, and 212-2 should be the reaction point for network efficiency. Such examples can be beneficial over some previous approaches, which may identify a reaction point as an upstream neighbor without considering network conditions beyond a neighboring network device and/or a Layer 2-Layer 3 boundary and/or without having a more complete network picture.

Network traffic control can include the network controller 202 sending a congestion notification 220 to the network device 210-1, which is across a Layer 2-Layer 3 boundary from the network device 210-3. In this example, switches 210-3 and 210-1 are in different Layer 2 networks 114-2, 114-1, and are across a Layer 2-Layer 3 boundary therebetween. Sending the congestion notification 220 to the network device 210-1 as the reaction point can include the network controller 202 adjusting the transmission rate from the network device 210-1.

Figure 3:
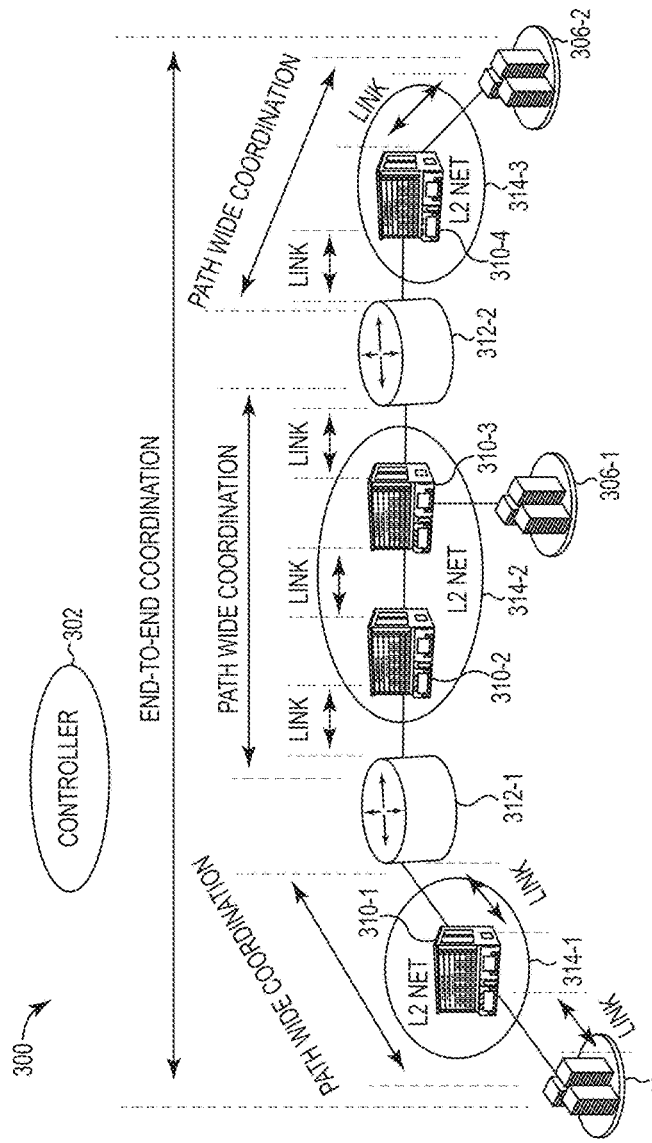

FIG. 3 is a diagram illustrating an example of a software defined network 300 according to the present disclosure. The SDN 300 can be analogous to the SDN 100 illustrated in FIG. 1. Accordingly, the network controller 302, the traffic source 304, the traffic destinations 306-1 and 306-2, the network devices 310-1, 310-2, 310-3, 310-4, 312-1, and 312-2, and the Layer 2 networks 314-1, 314-2, and 314-3 can be analogous to the network controller 102, the traffic source 104, the traffic destinations 106-1 and 106-2, the network devices 110-1, 110-2, 110-3, 110-4, 112-1, and 112-2, and the Layer 2 networks 114-1, 114-2, and 114-3 illustrated in FIG. 1.

The SDN 300 can include a plurality of Layer 2 networks 314-1, 314-2, and 314-3 including a number of switches 310-1, 310-2, 310-3, 310-4. The Layer 2 networks 314-1, 314-2, and 314-3 can be interconnected by a number of routers 312-1 and 312-2. The number of switches 310-1, 310-2, 310-3, 310-4 and the number of routers 312-1 and 312-2 can sense a number of network conditions and notify the network controller 302 regarding the number of network conditions. The network controller 302 can be in communication with the number of switches 310-1, 310-2, 310-3, 310-4 and the number of routers 312-1 and 312-2.

For example, using enhanced transmission selection (ETS) defined under the IEEE 802.1Qaz standard, link bandwidth can be allocated to different priorities on a percentage of total bandwidth basis. However, according to some previous approaches, this would be done on a link-by-link basis with no broader coordination. However, using such approaches may be inefficient in that the network devices would use DCB exchange (DCBX). DCBX is a discovery and initialization protocol that discovers resources of connected peers on a link-by-link basis.

In contrast, according to some examples of the present disclosure, the network controller 302 can provide network traffic control across the Layer 2 networks 314-1, 314-2, and 314-3 collectively to address congestion (e.g., in a link-by-link manner) based on the number of network conditions. Providing network traffic control can include allocating bandwidth across a plurality of Layer 2 and Layer 3 hops in the SDN 300 on a per data unit priority basis. The network controller 302 can receive information including indications of capabilities of the network devices 310-1, 310-2, 310-3, 310-4, 312-1, and 312-2 from the network devices 310-1, 310-2, 310-3, 310-4, 312-1, and 312-2. The network controller 302 can provide DCB functionality by coordinating settings for the network devices 310-1, 310-2, 310-3, 310-4, 312-1, and 312-2 based on their capabilities. In some examples, the network controller 302 can provide network traffic control (e.g., a DCB functionality) without the network devices 310-1, 310-2, 310-3, 310-4, 312-1, and 312-2 running a DCBX protocol. Such examples can relieve the network devices 310-1, 310-2, 310-3, 310-4, 312-1, and 312-2 from the burden of exchanging capabilities with their peers and allow for a centralized view of capabilities across the SDN 300, rather than a network including groups of localized capability exchanges. The network controller 302 can use its view of the SDN 300 to coordinate end-to-end bandwidth assignments by doing hop-by-hop bandwidth calculations and assignments. Thus, the network controller 302 can provide end-to-end coordination throughout the SDN 300 as well as path-wide coordination within each Layer 2 network 314-1, 314-2, and 314-3. Furthermore, the network controller 302 can coordinate bandwidth allocations for each switch 310-1, 310-2, 310-3, and 310-4, router 312-1 and 312-2, link, and/or priority in the SDN 300. As network traffic flows are recognized by the network controller 302 and the network devices 310-1, 310-2, 310-3, 310-4, 312-1, and 312-2 are programmed to transport the network traffic flows, the bandwidth assignments can be adjusted by the network controller 302 to efficiently meet the present traffic load on the SDN 300.

Figure 4:
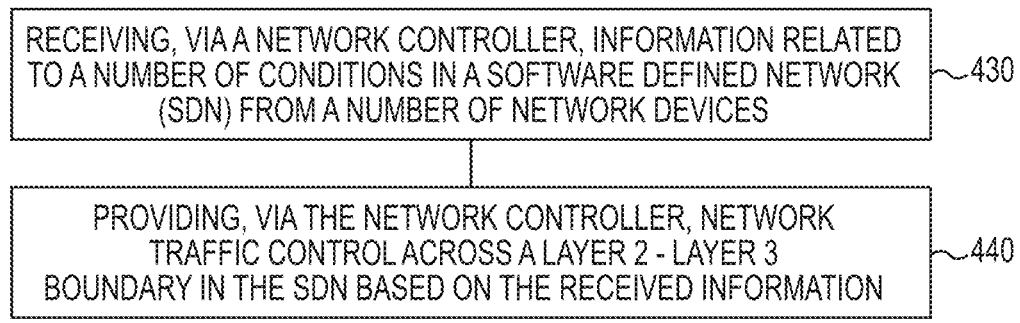

FIG. 4 is a flow chart illustrating an example of a method for network traffic control across a Layer 2-Layer 3 boundary in a software defined network according to the present disclosure. At block 430, the method can include receiving, via a network controller (e.g., network controller 102 illustrated in FIG. 1), information related to a number of conditions in a software defined network (e.g., SDN 100 illustrated in FIG. 1) from a number of network devices (e.g., network devices 110-1, 110-2, 110-3, 110-4, 112-1, and 112-2 illustrated in FIG. 1). At block 440, the method can include providing, via the network controller, network traffic control across a Layer 2-Layer 3 boundary in the SDN based on the received information. Examples of network traffic control include sending a per priority pause, identifying a reaction point, allocating bandwidth, sending and/or receiving congestion notifications, among others. However, network traffic control provided by an SDN controller are not directly analogous to network traffic control provided in a distributed nature in a non-SDN network because the SDN controller uses additional information from the SDN (e.g., the entire SDN) to make determinations and provide the network traffic control, as opposed to taking an action by a single network device based on a particular flow, a particular peer network device, and/or a particular Layer 2 network.

Figure 5:
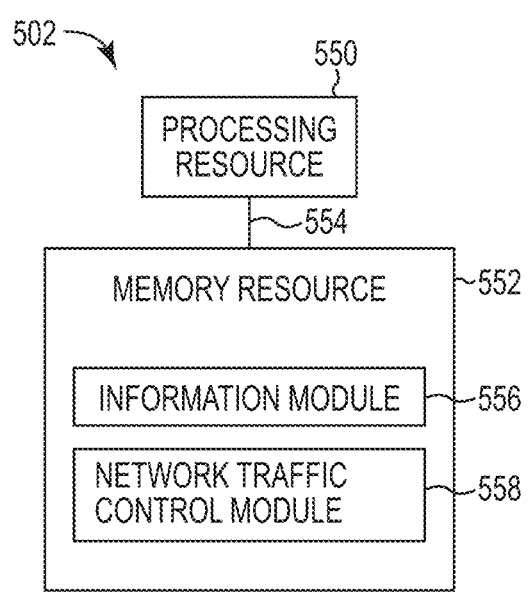

FIG. 5 illustrates an example of a network controller 502 according to the present disclosure. The network controller 502 can be analogous to the network controller 102 illustrated in FIG. 1. The network controller 502 can utilize software, hardware, firmware, and/or logic to perform a number of functions.

The network controller 502 can be a combination of hardware and program instructions configured to perform a number of functions (e.g., actions). The hardware, for example, can include a number of processing resources 550 and a number of memory resources 552, such as a machine-readable medium (MRM) or other memory resources 552. The memory resources can be internal and/or external to the network controller 502 (e.g., the network controller 502 can include internal memory resources and have access to external memory resources). The program instructions (e.g., machine-readable instructions (MRI)) can include instructions stored on the MRM to implement a particular function (e.g., an action such as providing network traffic control across a Layer 2-Layer 3 boundary). The set of MRI can be executable by one or more of the processing resources 550. The memory resources 552 can be coupled to the network controller 502 in a wired and/or wireless manner. For example, the memory resources 552 can be an internal memory, a portable memory, a portable disk, and/or a memory associated with another resource, e.g., enabling MRI to be transferred and/or executed across a network such as the Internet.

Memory resources 552 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of machine-readable media.

The processing resources 550 can be coupled to the memory resources 552 via a communication path 554. The communication path 554 can be local or remote to the network controller 502. Examples of a local communication path 554 can include an electronic bus internal to a machine, where the memory resources 552 are in communication with the processing resources 550 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 554 can be such that the memory resources 552 are remote from the processing resources 550, such as in a network connection between the memory resources 552 and the processing resources 550. That is, the communication path 554 can be a network connection. Examples of such a network connection can include local area network (LAN), wide area network (WAN), personal area network (PAN), and the Internet, among others.

As shown in FIG. 5, the MRI stored in the memory resources 552 can be segmented into a number of modules 336, 338 that when executed by the processing resources 550 can perform a number of functions. As used herein a module includes a set of instructions included to perform a particular task or action. The number of modules 556, 558 can be sub-modules of other modules. For example, the information module 556 can be a sub-module of the DCB module 558 and/or the information module 556 and the network traffic control module 558 can be contained within a single module. Furthermore, the number of modules 556, 558 can comprise individual modules separate and distinct from one another. Examples are not limited to the specific modules 556, 558 illustrated in FIG. 5.

The network controller 502 can include an information module 556, which can receive information from a plurality of Layer 2 networks (e.g., Layer 2 networks 114-1, 114-2, and 114-3) in an SDN (e.g., SDN 100 illustrated in FIG. 1). The network controller 502 can include a network traffic control module 558, which can provide network traffic control based on the received information. For example, the network traffic control can include allocation of bandwidth for a plurality of network devices and a plurality of links between network devices (e.g., network devices 110-1, 110-2, 110-3, 110-4, 112-1, and 112-2 illustrated in FIG. 1) in the SDN. The network controller 502 can allocate bandwidth for switches in each Layer 2 network and for routers interconnecting the Layer 2 networks.

The network controller 502 can provide network traffic control for a plurality of data unit priorities. The network traffic control can include computation of hop-by-hop bandwidth across the SDN and bandwidth can be allocated based on the computed hop-by-hop bandwidth across the SDN. Network traffic control can include computation of end-to-end bandwidth across the SDN and bandwidth can be allocated based on the computed end-to-end bandwidth across the SDN.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method comprising:
   receiving, via a network controller, information related to a number of conditions in a software defined network (SDN) from a number of network devices, the information comprising a congestion notification from a first network device regarding congestion in the SDN; and
   providing, via the network controller, network traffic control across a Layer 2-Layer 3 boundary in the SDN based on the received information, wherein providing the network traffic control comprises:
      determining, via the network controller, a second network device upstream of the first network device with respect to the congestion and based on information received from others of the number of network devices; and
      sending, via the network controller, a pause to the second network device, wherein the second network device is across the Layer 2-Layer 3 boundary from the first network device, and the pause is to cause pausing of a traffic flow that passes through the second network device.

2. The method of claim 1, wherein providing the network traffic control further comprises allocating, via the network controller, bandwidth across a plurality of Layer 2 and Layer 3 hops in the SDN on a per data unit priority basis.

3. The method of claim 1, wherein:
   the information comprises an indication of capabilities of the number of network devices; and
   providing the network traffic control comprises coordinating, via the network controller, settings for the number of network devices based on the capabilities.

4. The method of claim 3, wherein providing the network traffic control comprises coordinating, via the network controller, settings for the number of network devices without the number of network devices running a data center bridging exchange (DCBX) protocol.

5. A non-transitory machine-readable medium storing instructions executable by a processor to cause a network controller to:
   receive information from a plurality of Layer 2 networks in a software defined network (SDN), and
   provide network traffic control based on the received information, the network traffic control including allocation of bandwidth for a plurality of network devices and a plurality of links between network devices in the SDN, wherein:
      the instructions to provide network traffic control include instructions to compute hop-by-hop bandwidth across the SDN; and
      the instructions to allocate bandwidth comprise instructions to allocate bandwidth based on the computed hop-by-hop bandwidth across the SDN.

6. The medium of claim 5, wherein the instructions to provide network traffic control further include instructions to provide allocation of bandwidth for a plurality of data unit priorities.

7. The medium of claim 5, wherein the instructions to allocate bandwidth for the plurality of network devices comprise instructions to allocate bandwidth for a number of switches in each of the plurality of Layer 2 networks and a plurality of routers interconnecting the plurality of Layer 2 networks.

8. The medium of claim 5, wherein:
   the instructions to provide network traffic control further include instructions to compute end-to-end bandwidth across the SDN; and
   the instructions to allocate bandwidth further comprise instructions to allocate bandwidth based on the computed end-to-end bandwidth across the SDN.

9. A software defined network (SDN) network controller, comprising:
   a processor;
   a memory resource coupled to the processor, wherein the memory resource stores instructions executable on the processor to:
      receive a plurality of notifications regarding a number of network conditions in an SDN, wherein the SDN includes a plurality of Layer 2 networks including a number of switches interconnected by a number of routers, the plurality of notifications comprising a congestion notification from a first network device regarding congestion in the SDN; and provide network traffic control across the plurality of Layer 2 networks to address the congestion, wherein providing the network traffic control comprises:
identifying, by the instructions, a second network device separated from the first network device by a Layer 2-Layer 3 boundary, the second network device upstream of the first network device with respect to a traffic flow that passes through the first and second network devices, and
sending, by the instructions, a traffic control indication to adjust the traffic flow.

10. The SDN network controller of claim 9, wherein the network traffic control includes data center bridging (DCB) functionality, and
wherein the number of switches and the number of routers do not provide DCB functionality independent of the SDN network controller.

11. The SDN network controller of claim 9, wherein the SDN network controller comprises a cloud-provided functionality.

12. The SDN network controller of claim 9, wherein the SDN network controller comprises a discrete device.

13. The method of claim 1, wherein the pause sent to the second network device is to cause pausing of the traffic flow based on a first priority of the traffic flow, and the second network device is upstream of the first network device with respect to the traffic flow.

14. The method of claim 13, wherein the pause sent to the second network device is to not cause pausing of another traffic flow having a second priority different from the first priority.

15. The method of claim 1, further comprising:
selecting, by the network controller, the second network device from a plurality of network devices to which the pause is sent, based on the information received from the others of the number of network devices.

16. The method of claim 1, wherein the second network device is a router that includes a plurality of transmit queues, the plurality of transmit queues comprising a first queue used to perform traffic communication within a Layer 2 network, and a second queue used to perform traffic communication with another router, and
wherein the pause sent to the second network device causes pausing of the traffic communication between the routers and not the traffic communication within the Layer 2 network.

17. The SDN network controller of claim 9, wherein the traffic control indication comprises a pause from the SDN network controller to the second network device, the pause to cause pausing of the traffic flow.

18. The SDN network controller of claim 9, wherein the traffic control indication comprises a congestion notification from the SDN network controller to the second network device, the congestion notification to change a data rate of the traffic flow.

19. The SDN network controller of claim 9, wherein the instructions are executable on the processor to:
select the second network device from a plurality of network devices to which the traffic control indication is sent, based on the number of network conditions.

20. The SDN network controller of claim 9, wherein the second network device is a router that includes a plurality of transmit queues, the plurality of transmit queues comprising a first queue used to perform traffic communication within a Layer 2 network, and a second queue used to perform traffic communication with another router, and
wherein the traffic control indication sent to the second network device causes a restriction of the traffic communication between the routers and not the traffic communication within the Layer 2 network.

* * * * *